Figure 4:
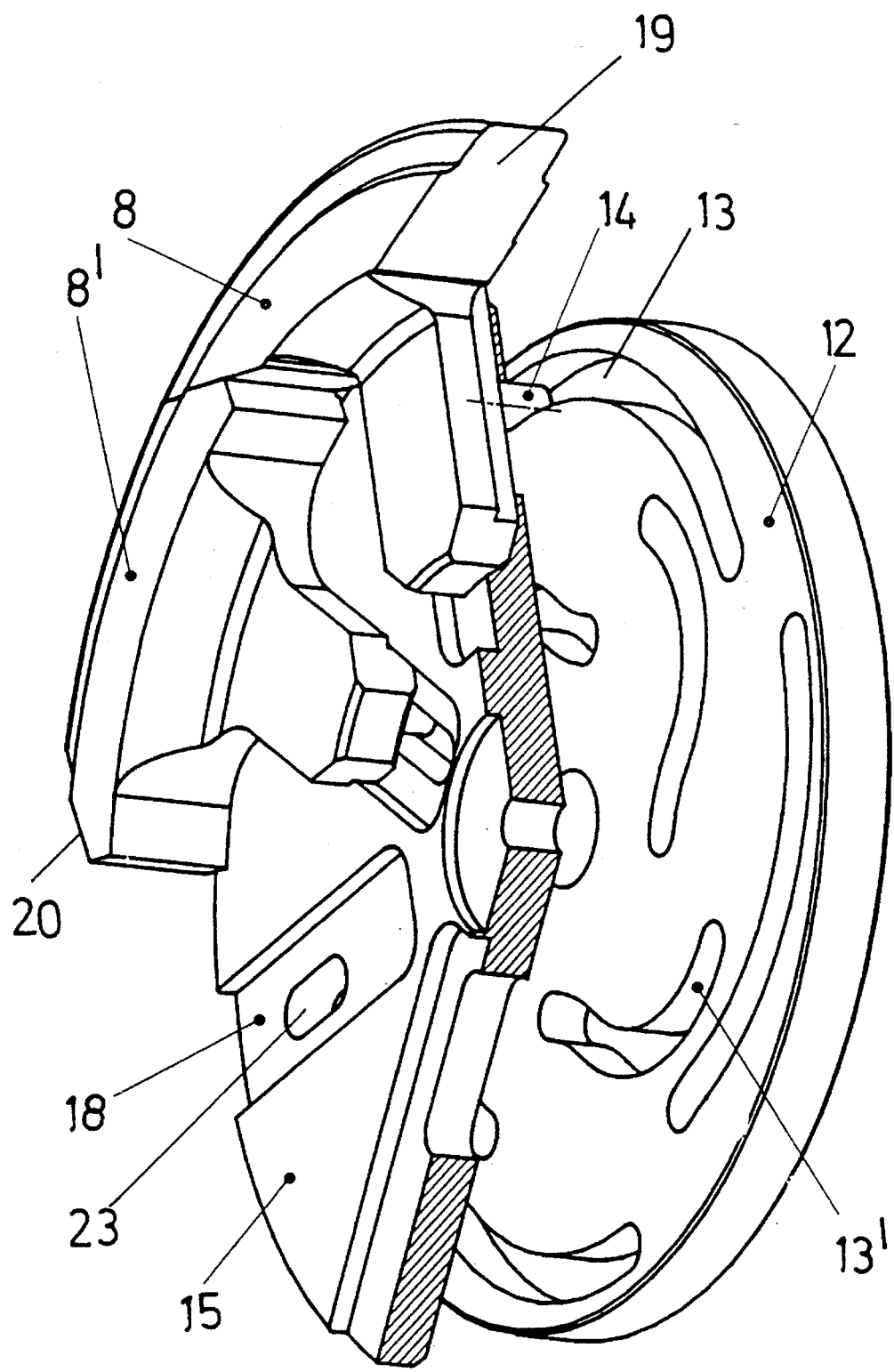

United States Patent [19]

Schwaiger et al.

[11] Patent Number: 5,494,434
[45] Date of Patent: Feb. 27, 1996

[54] INJECTION MOLDING MOLD FOR PRODUCING A FITTING HAVING AN ANNULAR GROOVE

[75] Inventors: Ernst Schwaiger; Erich Mitteregger, both of Micheldorf, Austria

[73] Assignee: IFW-Manfred Otte Gesellschaft m.b.H. & Co. KG., Micheldorf, Austria

[21] Appl. No.: 253,353

[22] Filed: Jun. 3, 1994

[30] Foreign Application Priority Data

Jun. 4, 1993 [AT] Austria ................................. 1089/93

[51] Int. Cl.⁶ .................................................. B29C 45/40
[52] U.S. Cl. .................. 425/577; 425/450.1; 425/451.4; 425/451.9; 425/DIG. 5; 425/DIG. 58
[58] Field of Search ............................. 425/450.1, 451.4, 425/451.9, 556, 577, DIG. 5, DIG. 58

[56] References Cited

U.S. PATENT DOCUMENTS 4,708,632  11/1987  Mitteregger et al. ............ 425/DIG. 58

FOREIGN PATENT DOCUMENTS

| 327177 | 3/1976 | Austria. |
| 2752672 | 5/1979 | Germany. |
| 434013 | 11/1974 | U.S.S.R. .................. 425/DIG. 58 |

Primary Examiner—Tim Heitbrink
Attorney, Agent, or Firm—Wenderoth, Lind & Ponack

[57] ABSTRACT

Described is an injection molding mold for the production of fittings from thermoplastic material which have at least one annular groove at the inside, comprising a mold core which is formed in the region of the annular groove of the molding by segments (8, 8') which can be moved inwardly to such an extent that the mold core can be moved out of the annular groove in the axial direction, wherein the inward and outward movement of the segments (8, 8') is produced by rotation of a control shaft (11) and wherein each of the segments (8, 8') which are only radially movably guided in a stationary guide disk (15) is provided with a projection (14) which engages into a guide slot (13, 13') in a control disk (12) which is fixedly connected to the control shaft (11).

9 Claims, 2 Drawing Sheets

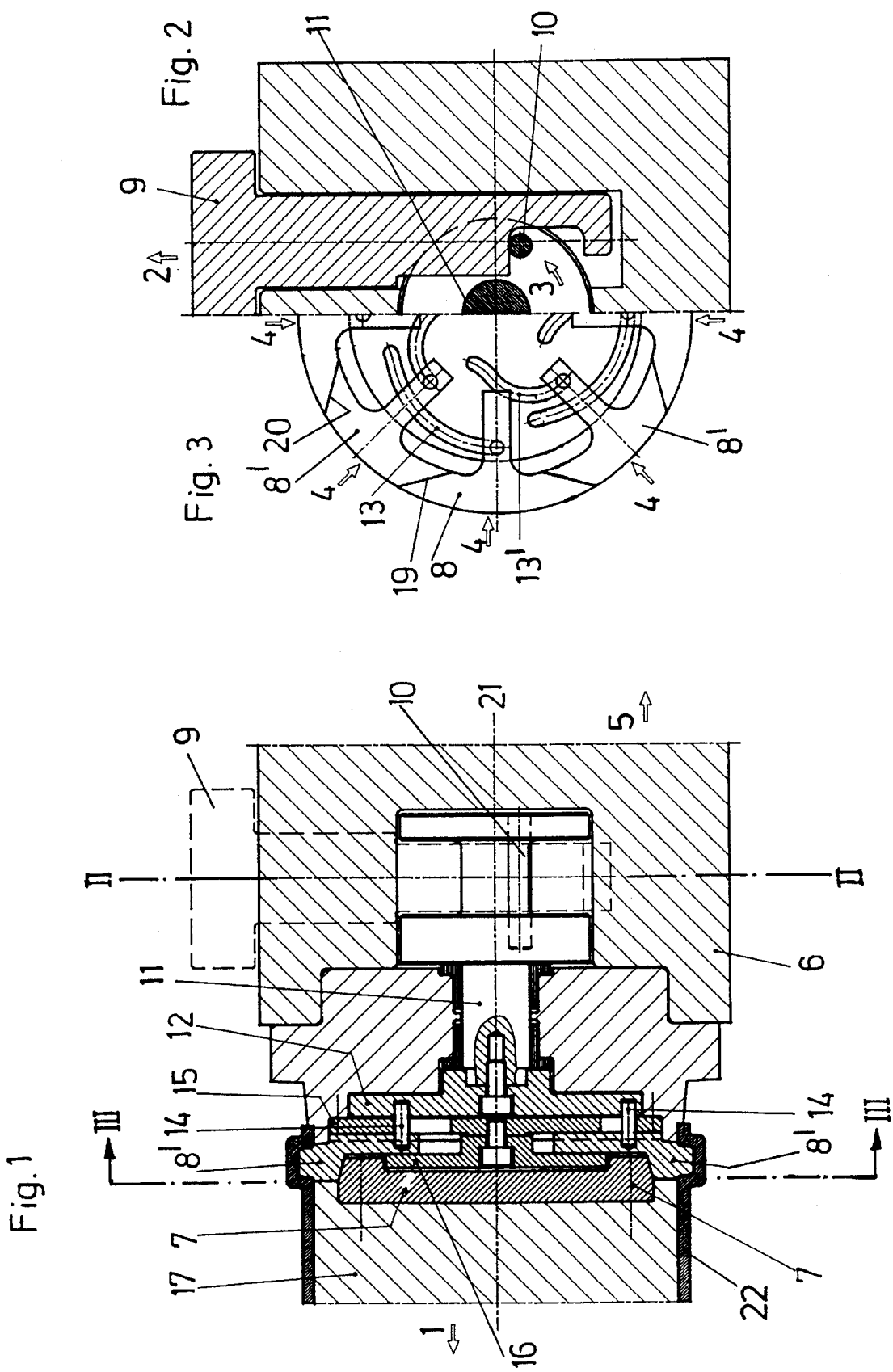

5,494,434

INJECTION MOLDING MOLD FOR PRODUCING A FITTING HAVING AN ANNULAR GROOVE

The invention relates to an injection molding mold for the production of fittings from thermoplastic material which have at least one annular groove at the inside, comprising a mold core which in the region of the annular groove of the molding is formed by segments which can be moved inwardly to such an extent that the mold core can be moved out of the annular groove in the axial direction, wherein the inward and outward movement of the segments is produced by rotation of a control shaft and displacement in a guide slot of at least one projection which projects from a segment.

DE-A-27 52 672 discloses an apparatus of that kind in which there are provided a plurality of segments which are pivotably connected together in the manner of a chain and which are movable on a spiral path. The first segment of the chain is connected to the control shaft and the last segment is provided with a pin which is guided in a stationary sliding guide.

By virtue of the pivotal interconnection of the segments, the known structure has such a large number of components which are movable relative to each other, that it is structurally complicated and also susceptible to trouble. The advantages in principle, which arise by virtue of the drive for the segments by means of a rotatable control shaft, have therefore never come to fruition in a practical context.

The object of the present invention is thus a considerable structural simplification in an apparatus of the kind defined in the opening part of this specification. That is achieved in that each of the segments which are only radially movably guided in a stationary guide disk is provided with a projection which engages into a guide slot in a control disk which is fixedly connected to the control shaft.

It is already known per se (see AT 328 177) for the segments which result in the formation of the annular groove to be only radially inwardly and outwardly movable. It is therefore possible to have recourse to tried-and-tested proposals, in regard to the configuration of the segments as such. In particular it will be appreciated that it is also provided in execution of the invention that arranged between each two segments which are defined by outwardly convergent taper surfaces is a respective segment which is provided with outwardly divergent taper surfaces.

A particular advantage of the invention is that a slider can be provided for actuation of the control shaft, which slider is movable normal to the longitudinal central plane of the mold. As the mold halves of the outer mold also move away from each other and close again in that direction, movement of the slider can be easily effected with that of the movable outer mold halves.

Further features of the invention are described in greater detail with reference to the drawing in which:

FIG. 1 is a view in longitudinal section through a mold core according to the invention, FIG. 2 is a view in cross-section taken along line II—II in FIG. 1, FIG. 3 is a front view of the parts of the apparatus which are to the right of the line III—III, and FIG. 4 is a perspective view of the segments and the guide means thereof.

The illustrated apparatus serves for the production of a tube or pipe 22 of plastic material, in which respect it is only the mold core and not the outer mold which is divisible along the longitudinal central plane 21 of the tube or pipe 22 that is of interest in connection with the present invention. The mold core comprises two parts which are movable relative to each other in the axial direction; upon opening of the mold the part 17 with the centering ring 7 fixed thereto is moved in the direction indicated by the arrow 1 while the part 16 which serves to mold the end of the pipe or tube is moved in the direction indicated by the arrow 5.

The segments 8, 8' are movable in a radial direction by virtue of the movement of the centering ring 7 out of the support surfaces of the segments 8, 8'. In order to displace the segments 8, 8' inwardly out of the illustrated position and thereby to release the tube or pipe 22, the segments 8, 8' are provided with pins or projections 14 which are guided in guide slots 13, 13' of the rotatable control disk 12. In the axial direction the segments 8, 8' are secured on the one hand by the guide disk 15 and on the other hand by the holding disk 16. The guide disk 15 is fixedly connected, for example by screw means, to the part 6 of the mold core. The holding disk 16 is in turn arranged on the guide disk 15. The rotary movement of the control disk 12 which results in the segments 8, 8' being moved outwardly and inwardly is produced by means of a slider 9. When the slider 9 is moved in the direction 2, it acts on the pin 10 and thereby rotates the control shaft 11 in the direction indicated at 3.

The configuration of and guidance for the segments 8, 8' can be seen in greater detail more particularly from FIG. 4. All segments 8, 8' are guided in radially extending guide grooves 18 in the stationary guide disk 15. The projections 14 which are arranged at the rear side of each individual segment 8, 8' pass through radially extending elongate holes 23 at the bottoms of the guide grooves 18. The projections 14 engage into the guide slots 13, 13' in the control disk 12, the rotary movement of which causes the segments 13, 13' to be displaced in the direction indicated by the arrows 4. Segments 8 with outwardly divergent taper surfaces 19 and segments 8' with outwardly convergent taper surfaces 20 are disposed in alternate succession over the periphery of the annular groove to be formed. The guide slots 13 and 13' respectively associated with each group of segments 8 and 8' are to be of such a configuration that the segments do not jam. In that respect it can be provided in per se known manner that the taper surfaces, which bear against each other, of adjacent segments are guided against each other over the entire radial path of movement.

We claim:

1. An injection molding mold for producing from thermoplastic material a fitting having in at least one internal annular groove, said mold comprising:

a mold core including segments to form the annular groove, said segments being movable inwardly to an extent sufficient to enable said mold core to be moved in an axial direction out of the formed annular groove;

a stationary guide disk, said segments being guided for radial movement only by said guide disk;

a rotatable control shaft having fixedly connected thereto a control disk;

each said segment having a projection extending into a guide slot in said control disk; and rotation of said control shaft and said control disk causing radially inward and outward movement of said segments.

2. A mold as claimed in claim 1, further comprising a stationary holding disk, said segments being guided for said radial movement between said guide disk and said holding disk.

3. A mold as claimed in claim 1, wherein said mold core includes first and second parts that are separable in said axial direction, said segments being mounted on said first part, and a centering ring mounted on said second part and supporting said segments upon outward movement thereof.

4. A mold as claimed in claim 1, further comprising a slider mounted for movement in a direction normal to a longitudinal central plane of said mold to rotate said control shaft.

5. A mold as claimed in claim 1, wherein said control disk has therein plural guide slots, and each said projection extends into a respective said guide slot.

6. A mold as claimed in claim 1, wherein said guide disk has therein plural radial guide grooves, and each said segment has a portion slidably fitting into a respective said guide groove.

7. A mold as claimed in claim 6, wherein said guide disk has radially elongated holes at bottoms of said guide grooves, and each said projection extends through a respective said hole.

8. A mold as claimed in claim 1, wherein some of said segments have outwardly divergent tapered surfaces, and other of said segments have outwardly convergent tapered surfaces.

9. A mold as claimed in claim 8, wherein said segments with outwardly divergent tapered surfaces and said segments with outwardly convergent tapered surfaces are arranged alternately peripherally of said mold core.

* * * * *